United States Patent [19]

Kroupa

[11] Patent Number: 4,529,789
[45] Date of Patent: Jul. 16, 1985

[54] LIQUID CURABLE POLYORGANOSILOXANE COMPOSITIONS

[75] Inventor: Loretta A. Kroupa, Midland, Mich.

[73] Assignee: Dow Corning Corporation, Midland, Mich.

[21] Appl. No.: 639,051

[22] Filed: Aug. 9, 1984

Related U.S. Application Data

[62] Division of Ser. No. 592,481, Mar. 24, 1984, abandoned.

[51] Int. Cl.$^3$ ............................................ C08G 77/06
[52] U.S. Cl. ...................................... 528/15; 528/31; 528/32; 525/478; 350/96.1; 350/96.12; 350/96.13
[58] Field of Search ............................ 528/15, 31, 32; 525/478; 350/96.1, 96.12, 96.13

[56] References Cited

U.S. PATENT DOCUMENTS 3,284,406 11/1966 Nelson ................................ 260/46.5
3,436,366 4/1969 Modic .................................... 260/37
3,697,473 10/1972 Polmanteer ...................... 260/37 SB
4,128,299 12/1978 Maher .............................. 350/96.13
4,340,709 7/1982 Jeram ..................................... 528/15

*Primary Examiner*—Melvyn I. Marquis
*Attorney, Agent, or Firm*—Robert Spector

[57] ABSTRACT

Curable polyorganosiloxane compositions that can be cured to yield readily deformable, tough, elastomeric gels comprise a liquid triorganosiloxy endblocked polydimethylsiloxane containing terminal vinyl radicals, a resinous organosiloxane polymer containing dimethylvinylsiloxy, trimethylsiloxy and $SiO_{4/2}$ groups, a polyorganosiloxane containing at least 3 silicon-bonded hydrogen atoms per molecule, a substantially linear polydimethylsiloxane containing dimethylhydrogensiloxy terminal groups and a catalyst to promote curing of said composition. Gels prepared using preferred embodiments of these curable compositions are transparent and useful as pressure sensitive optical waveguides.

2 Claims, No Drawings

LIQUID CURABLE POLYORGANOSILOXANE COMPOSITIONS

This application is a division of application Ser. No. 592,481, filed 3-24-84 now abandoned.

BACKGROUND OF THE INVENTION

1. Field of the Invention

This invention relates to liquid polyorganosiloxane compositions which are curable by means of a hydrosilation reaction to yield tough elastomeric products.

2. Description of the Prior Art

Liquid compositions prepared by combining a vinyl-containing polydiorganosiloxane, an organohydrogensiloxane curing agent, a platinum-containing catalyst and, optionally, a filler are known in the art. These liquid compositions can be cured under relatively mild conditions to yield elastomeric or resinous products, depending upon the types and relative concentrations of reactants present in the initial curable composition. These curable compositions are useful in a variety of applications, including encapsulation of delicate electrical and electronic components, coating of various substrates, as pressure sensitive adhesives, and the formation of shaped articles by injection molding.

Reinforcing fillers such as fume silica have been used to improve the physical properties such as tensile strength, tear strength and modulus of cured polyorganosiloxane compositions.

The use of resinous siloxane copolymers as a replacement for reinforcing silica fillers to improve the physical properties of cured articles while retaining the transparency of an unfilled composition is taught in the prior art. Specifically, U.S. Pat. No. 3,284,406 to Nelson, which issued on Nov. 8, 1966, and U.S. Pat. No. 3,436,366 to Modic, which issued on Apr. 1, 1969, disclose using resinous copolymers containing $R_3SiO_{\frac{1}{2}}$, $R_2ViSiO_{\frac{1}{2}}$ and $SiO_{4/2}$ units for this purpose. In the foregoing formulae, R represents a monovalent hydrocarbon radical free of ethylenic unsaturation and Vi represents a vinyl radical.

The cured materials disclosed in the aforementioned Nelson and Modic patents typically exhibit hardness values of from 35 to 80 on the Shore A durometer scale, which is indicative of relatively highly crosslinked materials. Modic teaches inclusion of a finely divided non-reinforcing filler when transparency of the cured article is not a requirement. The curing agents taught by Modic are liquid polyorganohydrogensiloxanes containing at least two silicon-bonded hydrogen atoms per molecule, while the curing agents disclosed in the aforementioned Nelson patent contain at least three silicon-bonded hydrogen atoms per molecule.

A means for increasing the tear strength of cured polyorganosiloxanes prepared from liquid compositions similar to those disclosed in the aforementioned Modic patent while maintaining the viscosity of the curable composition within the range from 10 to 500 Pa.s is taught in U.S. Pat. No. 4,340,709 to Jeram and Smith, which issued on July 20, 1982. In accordance with the disclosure of this patent, a liquid polydiorganosiloxane containing from 0.14 to 2.0 mole percent of vinyl radicals is cured using the combination of a crosslinking agent and a "coupler." The coupler is a linear polyorganosiloxane containing only two silicon-bonded hydrogen atoms, one at each of the two terminal positions of each molecule. The crosslinking agents are defined as "hydride resins having only terminal hydrogen atoms or a linear hydride polysiloxane" containing hydrogen atoms only in the internal portion of each molecule on nonterminal silicon atoms.

Jeram and Smith limit the concentration of difunctional coupler to the range of 4 to 15 parts by weight per 100 parts by weight of vinyl-containing polydiorganosiloxane. The coupler is further defined as providing a molar concentration of silicon-bonded hydrogen atoms that is from 0.67 to 1.3 times the molar concentration of vinyl radicals present in the curable composition. The cured compositions exemplified by Jeram and Smith exhibit hardness values of from 21 to 43 on the shore A durometer scale after curing for one hour at 100° C. Hardness values in this range are desirable for protective coatings, encapsulating materials and certain types of molded articles, however the cured products disclosed by Jeram and Smith would not be useful for fabricating cured gel type materials which are required to be compressible under relatively low pressure.

The concept of using a difunctional curing agent in combination with a tri- or higher functional curing agent, both of which contain silicon-bonded hydrogen atoms, to improve the tensile properties of cured polyorganosiloxane elastomers is taught in U.S. Pat. No. 3,697,473, which issued to Polmanteer et al. on Oct. 10, 1972. The elastomers exemplified in this reference exhibit durometer values of from 11 to 38, measured on the Shore A scale. At least 10% of the available silicon-bonded hydrogen atoms are present in each of the two types of curing agents.

The tensile properties and hardness values reported in the aforementioned Nelson, Modic, Jeram et al. and Polmanteer et al. patents indicate that the cured articles exemplified in this prior art do not exhibit the unique combination of properties required for some applications of polyorganosiloxanes, for example, elastomeric optical waveguides.

Pressure sensitive optical waveguides require cured, noncellular articles in the form of blocks or sheets that are transparent, exhibit minimal light attenuation, and are deformable under relatively low pressure, for example light to moderate finger pressure, applied on one surface of the article. Suitable polyorganosiloxanes typically exhibit durometer values too low to be measured using the Shore A scale. In addition, the cured article must be sufficiently resilient to resume its original shape almost immediately following release of the pressure which deformed it, and sufficiently tough to resist being punctured and/or torn when this pressure is repeatedly applied over only a fraction of the total area of one surface on the waveguide. If the surface of the waveguide on which deformation occurs is overlayed with a transparent film or membrane, the adhesion along this interface must be sufficient to prevent separation between the two components and resultant void formation. The foregoing combination of properties considered desirable for elastomeric waveguides have not been found in the prior art pertaining to polyorganosiloxane compositions.

An objective of this invention is to provide liquid polyorganosiloxane compositions that can be rapidly cured at relatively low temperatures to yield readily deformable, resilient, tough elastomeric gels.

SUMMARY OF THE INVENTION

It has now been found that the foregoing objective can be achieved using the liquid polyorganosiloxane compositions of this invention, which are obtained by mixing a vinyl terminated polydimethylsiloxane, a resinous organosiloxane copolymer comprising dimethylvinylsiloxy, trimethylsiloxy and $SiO_{4/2}$ groups, a polyorganosiloxane containing at least three silicon-bonded hydrogen atoms per molecule, a substantially linear polydimethylsiloxane containing dimethylhydrogensiloxy terminal groups and a catalyst to promote curing of said composition. The molar concentration of silicon-bonded hydrogen atoms present in the linear polydiorganosiloxane is at least 1.6 times the molar concentration of vinyl radicals in the curable composition.

DETAILED DESCRIPTION OF THE INVENTION

This invention relates to a curable, liquid polyorganosiloxane composition consisting essentially of the product obtained by mixing (A) 100 parts by weight of at least one liquid triorganosiloxy endblocked polydimethylsiloxane, said triorganosiloxy radicals being selected from dimethylvinylsiloxy and phenylmethylvinylsiloxy, where said polydimethylsiloxane exhibits a viscosity of from 1.0 to 500 Pa.s at 25° C.; (B) from 5 to 25 parts of a benzene-soluble copolymer consisting essentially of units of the formulae $CH_2=CH(CH_3)_2SiO_{\frac{1}{2}}$, $(CH_3)_3SiO_{\frac{1}{2}}$ and $SiO_{4/2}$, where the molar ratio of the combination of $CH_2=CH(CH_3)_2SiO_{\frac{1}{2}}$ and $(CH_3)_3SiO_{\frac{1}{2}}$ units to $SiO_{4/2}$ units is from 0.7 to 1.2:1 inclusive, and vinyl-containing units constitute from 2 to 8 percent by weight of said copolymer; (C) an organosiloxane of the formula $H(CH_3)_2SiO[Si(CH_3)_2O]_xSi(CH_3)_2H$, where x is an integer from 0 to 50, in an amount sufficient to provide at least 1.6 silicon-bonded hydrogen atoms per vinyl radical present in said composition; (D) a polyorganosiloxane containing at least three silicon-bonded hydrogen atoms per molecule in an amount sufficient to provide from 5 to 15 mol % of the silicon-bonded hydrogen atoms present in said composition, with the proviso that the total number of silicon-bonded hydrogen atoms present in (C) and (D) is from 1.8 to 2.9 times the number of vinyl radicals present in said composition; and (E) an amount of platinum catalyst sufficient to promote curing of said composition. Preferred compositions, when cured, are transparent in the absence of filler and exhibit a compressibility of 2.2 mm under a load of from 14 to 50 g. applied using a 1.6 cm. diameter spherical foot, and a resistance to penetration under a load of at least 400 g. applied using a 1.2 cm. diameter cylindrical foot.

1. The Vinyl Endblocked Polydimethylsiloxane

The triorganosiloxy endblocked polydimethylsiloxane is referred to hereinabove as (A). For the purposes of this invention, the triorganosiloxy group contains a vinyl radical and two methyl radicals bonded to silicon or a vinyl, a phenyl and a methyl radical bonded to silicon. (A) is described herein as a polydimethylsiloxane, however it may contain small amounts of other units, including monomethylsiloxane and other mono- or diorganosiloxane units, which are often formed during synthesis of the polymer, so long as these units do not substantially alter the properties of (A).

(A) can be any triorganosiloxy endblocked polydimethylsiloxane that exhibits a viscosity of from 1 to 500 Pa.s. Polymers of this type are well known and commercially available. To achieve the optimum combination of compressibility, resiliency and toughness that characterize preferred cured products of this invention, the molecular weight distribution of the various polymeric species present in (A) should be within the limits specified in U.S. Pat. No. 4,162,243, which issued to C. L. Lee et al. on July 24, 1979, and is hereby incorporated by reference thereto. These polydimethylsiloxanes contain at least one polymeric species (1) at a concentration greater than those of the most immediately adjacent polymeric species exhibiting molecular weights that are higher and lower than those of (1). Polymeric species (1) can therefore be described as a peak molecular weight (PMW) species, having a molecular weight, as determined by gel permeation chromatography, that is in the range of from 68,000 to 135,000 and corresponds to a maximum on the molecular weight distribution plot.

In addition to containing at least one PMW species as defined hereinabove, preferred embodiments of (A) also exhibit a dispersity index (DI) value greater than 3.8. The DI value takes into account the concentration of all polymeric species present in (A), and is obtained by dividing the weight average molecular weight of a given polymer by its number average molecular weight.

The molecular weight of the lowest molecular weight polymeric species present in preferred embodiments of (A) is within the range from 854 to 3146, and the molecular weight of the highest molecular weight polymeric species is in the range from 174,000 to 370,000.

The molecular weight distribution plot for polydimethylsiloxane (A) can exhibit only one maximum or PMW value. Alternatively, the molecular weight distribution in (A) may be such that it contains two or more PMW species which differ in molecular weight and are present at a concentration exceeding that of species having molecular weight values closest to and on either side of the value for any give PMW species. It is preferable that (i) the molecular weight of the PMW species which is present at the highest concentration, relative to the other PMW species, be within the foregoing range of from 68,000 to 135,000, and (ii) the dispersity index of (A) be greater than 3.8.

To achieve the optimum combination of compressibility, resiliency and puncture resistance in the cured product, (A) is preferably a mixture of at least two liquid triorganosiloxy endblocked polydimethylsiloxanes wherein one contains a PMW species within the range of from 70,000 to 90,000, exhibits a dispersity index of greater than 3.8, and constitutes from 30 to 70% by weight of the mixture. The second polydimethylsiloxane contains a PMW species within the range of from 20,000 to 40,000 and exhibits a dispersity index of about 3.

(A) can also include a third triorganosiloxy endblocked polydimethylsiloxane containing a PMW species within the range of 11,000 to 14,000 and exhibiting a dispersity index of about 2. This species constitutes from 5 to 30% of the weight of (A).

Conventional polymerization methods for preparing triorganosiloxy endblocked polydimethylsiloxanes will not inherently yield products corresponding to preferred embodiments of (A). These embodiments can be obtained as disclosed hereinbefore by blending two or more polydimethylsiloxanes of different molecular weights in the proportions required to achieve the aforementioned PMW specie or species, dispersity index and molecular weight distribution.

Another method of preparing preferred embodiments of (A) is described by Lee et al. in U.S. Pat. No. 3,445,426 which issued on May 20, 1969 is hereby incorporated by reference to show a method of preparing suitable polydimethylsiloxanes. Briefly, the method produces a monodispersed hydroxyl endblocked polydimethylsiloxane which can be reacted with a hexaorganodisilazane, triorganochlorosilane, or triorgano(N-methylacetamido)silane. Such monodispersed polydimethylsiloxnes can be blended to produce (A). Also disclosed by Lee et al. is a method of making a fluid having two PMW species. In this method, polymerization is started and allowed to proceed for a determined time, then more ingredients are added and the polymerization is allowed to continue to yield an (A) having a major PMW species and a minor PMW species.

Preferably, the triorganosiloxy endblocking group of (A) is a dimethylvinylsiloxy group.

2. The Organosiloxane Resin

The resinous organosiloxane copolymer (B) contributes to the unique combination of physical properties that distinguishes the cured products of this invention from prior art materials. These copolymers contain units of the formulae $(CH_3)_2(CH_2=CH)SiO_{\frac{1}{2}}$, $(CH_3)_3SiO_{\frac{1}{2}}$ and $SiO_{4/2}$. The molar ratio of the combined $(CH_3)_2(CH_2=CH)SiO_{\frac{1}{2}}$ and $(CH_3)_3SiO_{\frac{1}{2}}$ units to $SiO_{4/2}$ units is from 0.7:1 to 1.2, inclusive. Vinyl containing units constitute from 2 to 8% by weight of the resin, and the resin preferably contains at least two vinyl radicals per molecule of copolymer. Preferably, the ranges for the molar ratio of dimethylvinylsiloxy:trimethylsiloxy: $SiO_{4/2}$ units is 0.08–0.1:0.6–1.1:1.

A precursor of the resinous copolymers corresponding to ingredient (B) defined hereinbefore, can be prepared as described in U.S. Pat. No. 2,676,182, which issued to Daudt and Tyler on Apr. 20, 1954 and is hereby incorporated in its entirety by reference. The copolymers described in this patent contain from 2 to 23 percent by weight of hydroxyl groups, which is considerably above the maximum level of about 0.8 weight percent preferred for precursors of (B). The hydroxyl content of the precursor is conveniently reduced to the desired level by employing a higher concentration of triorganosiloxane capping agent than the concentration range taught in the aforementioned U.S. Pat. No. 2,676,182. Briefly, this method comprises reacting under acidic conditions a silica hydrosol with hexamethyldisiloxane or trimethylchlorosilane. To obtain (B), the required amount of silazane, siloxane or silane containing a vinyl and two methyl radicals bonded to silicon is reacted with the resultant product.

The presence of (B) in the curable compositions of this invention is necessary to achieve the properties required in the cured gel. Less than about 5%, based on the weight of (A), will usually not provide the desired resiliency and toughness, while more than about 25% by weight often increases the viscosity of the curable composition to the extent that it cannot be easily processed under conventional conditions of temperature and pressure. In addition, the hardness of the cured gel is increased to the extent that it is not easily deformed by finger pressure.

3. The Organohydrogensiloxanes

A characteristic feature of the present polyorganosiloxane compositions is the ratio of the number of silicon-bonded hydrogen atoms present in the linear dimethylhydrogensiloxy terminated polydimethylsiloxane, (C), to the number of vinyl radicals present in the ingredients identified hereinabove as (A) and (B). This ratio is greater than 1.6:1 and preferably from 1.70:1 to 2.50:1.

(C) provides at least 85%, preferably from 89 to 95% of the total number of silicon-bonded hydrogen atoms present in the curable compositions of this invention. This number is from 1.8 to 2.9 per vinyl radical, preferably from 1.90 to 2.80 per vinyl radical. (C) typically contains an average of from 0 to about 50 dimethylsiloxane units per molecule.

(C) is represented by the formula $H(CH_3)_2SiO[SiO(CH_3)_2]_xSi(CH_3)_2H$ where x is from 0 to 50. Preferably the average value of x is from 10 to 15.

Dimethylhydrogensiloxy terminated polydimethylsiloxanes useful as (C) are well known, and include, but are not limited to, those disclosed in the aforementioned U.S. Pat. No. 3,697,473 to Polmanteer et al. The relevant portions of this patent are hereby incorporated by reference as a teaching of organosiloxanes containing two terminally bonded hydrogen atoms.

The second of the two types of polyorganosiloxanes containing silicon-bonded hydrogen atoms has at least three silicon-bonded hydrogen atoms per molecule, and is identified hereinabove as ingredient (D). This ingredient exhibits a viscosity of up to 10 Pa.s at 25° C. and can contain siloxane units such as $HSiO_{1.5}$, $CH_3HSiO$, and $(CH_3)_2HSiO_{\frac{1}{2}}$ in addition to methylsilsesquioxane, dimethylsiloxane, trimethylsiloxy, and $SiO_{4/2}$ units. Alternatively, ingredient (D) can be a cyclic compound such as

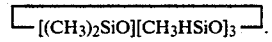

Cyclic polyorganosiloxanes contain from 4 up to about 8 siloxane units per molecule.

Organohydrogensiloxanes containing 3 or more silicon-bonded hydrogen atoms per molecule and no more than one hydrogen per silicon atom are well known, as are methods for preparing these siloxanes. Preferred siloxanes are linear polymethylhydrogensiloxanes of the general formula $R(CH_3)_2SiO[Si(CH_3)_2O]_a[SiH(CH_3)O]_bSi(CH_3)_2R$ where R represents a hydrogen atom or a methyl group, b is from 3 to 30 and the value of a is such that the polymer exhibits a viscosity of up to 10 Pa.s at 25° C. most preferably, a is 3, b is 5 and R is a methyl group.

4. The Catalyst

The ingredients identified hereinbefore as (A), (B), (C), and (D) will react in the presence of a suitable catalyst to yield an elastomeric gel. A preferred class of catalysts includes the platinum compositions that are known to catalyze the reaction between silicon-bonded hydrogen atoms and olefinic double bonds, particularly silicon-bonded vinyl groups, and that are soluble in (A). A particularly suitable class of platinum-containing catalysts are the complexes prepared from chloroplatinic acid and certain unsaturated organosilicon compounds and described by Willing in U.S. Pat. No. 3,419,593, which issued on Dec. 31, 1968 and is hereby incorporated herein by reference to show these complexes and their preparation. One preferred catalyst of this type is a reaction product of chloroplatinic acid and sym-divinyltetramethyldisiloxane.

The platinum catalyst (E) can be present in an amount sufficient to provide at least one part by weight of platinum for every one million parts by weight of (A). It is preferred to use sufficient catalyst so that there is present from 5 to 50 parts by weight platinum for every one million parts by weight of (A). It is to be understood that amounts of platinum greater than 50 parts per million are effective but are unnecessary and uneconomical, especially when the preferred catalyst is used.

Mixtures containing ingredients (A), (B), (C), and (D) with a platinum catalyst may begin to cure immediately on mixing at room temperature. In these instances, it may be desirable to retard the activity of the catalyst at room temperature with a suitable inhibitor if the composition is to be stored before curing. The inhibitor should allow the platinum to effectively catalyze the reaction between (A), (B), (C), and (D) at elevated temperatures.

One suitable type of platinum catalyst inhibitor is described in U.S. Pat. No. 3,445,420, which issued on May 20, 1969, to Kookootsedes et al. and is hereby incorporated herein by reference to show certain acetylenic inhibitors and their use. A preferred class of acetylenic inhibitors are the acetylenic alcohols, particularly 2-methyl-3-butyn-2-ol.

A second type of platinum catalyst inhibitor is described in U.S. Pat. No. 3,989,667, which issued on Nov. 2, 1976, to Lee and Marko, and which is hereby incorporated herein by reference to show certain olefinic siloxanes, their preparation and their use as platinum catalyst inhibitors.

A preferred type of platinum catalyst inhibitor is a polymethylvinylcyclosiloxane having three to six methylvinylsiloxane units per molecule. This type of inhibitor is different from the ones discussed hereinabove in that it functions by delaying initiation of the curing reaction at ambient temperature, thereby increasing the "pot life" of the composition. Once the curing reaction commences, however, it proceeds at the same rate as if no inhibitor were present. This type of an inhibitor will therefore not impart long-term storage stability to the present compositions.

The optimum concentration of platinum catalyst inhibitor is that which will provide the desired storage stability at ambient temperature without requiring an excessively prolonged time interval to cure the compositions at elevated temperatures. This amount can vary widely and will depend upon the particular inhibitor that is used, the nature and concentration of the platinum-containing catalyst and the nature of the organohydrogensiloxane reactants (C) and (D).

Inhibitor concentrations as low as one mole of inhibitor per mole of platinum will in some instances yield a satisfactory level of storage stability and desirable curing period. In other cases, inhibitor concentrations of up to 10, 50, 100, 500 or more moles per mole of platinum may be needed. The optimum concentration for a particular inhibitor in a given composition can be determined by routine experimentation. Inhibited compositions are typically cured by heating them to a temperature of 70° C. or higher.

If transparency is not a requirement, the curable composition of this invention can also contain conventional additives, including pigments, reinforcing fillers, extending fillers and heat stabilizers.

The curable compositions of this invention can readily be prepared using any conventional method that ensures homogeneous blending of the ingredients. The order of addition of the various ingredients is not critical if the composition is to be used immediately, however it has been found preferable to combine ingredients (A), (B) and (E), and thereafter add (C) and (D). This permits the small amount of catalyst (E) to become well dispersed in a mixture of (A) and (B) prior to the beginning of any curing reaction. Suitable two package compositions can be made using such a technique. For example, a convenient two package composition can be prepared by combining part of (A), part of (B), and all of (E) in one package and the remainder of (A) and (B), with all of (C) and (D), in a second package such that equal weight amounts of the contents of package one and package two can be mixed to produce the compositions of this invention. Single package compositions can be prepared by combining (A), (B), (C), (D) and (E) together with a platinum catalyst inhibitor. These inhibited compositions can be stored for extended periods of time under ambient conditions without curing, but will still cure when heated above 70° C., preferably above 100° C. to shorten the cure time.

Depending upon the desired end use application, the viscosity of the present curable compositions can vary from 0.1 up to 100 Pa.s at 25° C. To facilitate processing in injection operations and minimize entrapment of air bubbles during mixing, viscosities of from 0.5 to 10 Pa.s are preferred.

The unique combination of compressibility, resiliency and toughness exhibited by preferred cured products prepared using the compositions of this invention are desirable in a variety of end use applications including diaphragms, as the filler material in mammary prostheses, as injection seals for inflatable medical devices and as potting and encapsulating materials. In the absence of the optional additives disclosed hereinabove, the present compositions are transparent in the cured state.

As disclosed hereinbefore, transparent, elastomeric gels prepared using the curable compositions of this invention are particularly useful as pressure sensitive optical waveguides. In this application, a light beam directed through a waveguide formed from a transparent cured gel of this invention can be interrupted, deflected or varied in wavelength in response to deformation of the waveguide. The deformation can be induced by applying an electrical potential across the cross section of the waveguide or by mechanical means, such as finger pressure. The modulation of light beams in response to deformation of an elastomeric waveguide induced by a varying electrical potential is disclosed in U.S. Pat. No. 4,128,299, which issued on Dec. 5, 1978, and is incorporated herein by reference.

The combination of transparency, compressibility, resiliency, and toughness exhibited by preferred cured elastomeric gels of this invention make these gels particularly useful as touch-sensitive optical waveguide switches. In this application, interruption or deflection of a light beam being transmitted along the waveguide is accomplished by applying sufficient finger pressure to deform one surface of the waveguide.

The present cured gels are sufficiently compressible that they can be deformed under relatively light finger pressure to the extent required to function effectively as an optical switch, and sufficiently tough that the gel will not tear or fracture following repeated deformations. Tears, fractures and other structural defects are undesirable because they can refract or deflect light passing through a waveguide, making it unsuitable for further use.

If the waveguide is to be employed as a touch-sensitive optical waveguide switch, the surface characteristics of the cured polyorganosiloxane gel that forms the waveguide or the environment in which the waveguide will be used may be such that it is desirable to cover at least the contact surface of the waveguide with a flexible membrane formed from a synthetic organic polymer. In those areas where deformation of the waveguide occurs, it is vital that the adhesion between the cured polyorganosiloxane and the overlying membrane be sufficient to avoid separation of the membrane and the waveguide when the deforming pressure is released. A separation between membrane and waveguide will result in voids that may drastically alter the optical transmittance of the waveguide to the extent that it will no longer function as originally intended. The preferred gels of this invention exhibit excellent adhesion to many types of synthetic organic polymers.

The following examples disclose preferred embodiments of the present compositions and should not be construed as limiting the scope of the invention as defined in the accompanying claims. All parts and percentages are by weight unless otherwise specified.

EXAMPLE 1

Sample Preparation

Curable compositions were prepared by combining all of the ingredients described hereinafter, with the exception of the platinum-containing catalyst, and mixing until a homogeneous composition was obtained. The platinum catalyst was then blended into the composition, following which the composition was desired for 20 minutes under a pressure of 1 cm. of mercury. Equal portions of each of the 16 compositions were transferred into individual containers and cured at 65.5° C. for 20 minutes. After cooling to ambient temperature, the samples were evaluated for compressibility and fracture resistance as described hereinafter.

Ingredient $A^1$ was a dimethylvinylsiloxy endblocked polydimethylsiloxane exhibiting a peak molecular weight species, determined by gel permeation chromatography, of 75,099, a dispersity index of 7.44 and a viscosity of about 30 Pa.s at 25° C.

Ingredient $A^2$ was a dimethylvinylsiloxy endblocked polydimethylsiloxane exhibiting a peak molecular weight species, determined by gel permeation chromatography, of 12,554, a dispersity index of 2.1 and a viscosity of about 0.4 Pa.s at 25° C.

The third ingredient was a 35 weight percent solution of a resinous organosiloxane copolymer (B) in a dimethylvinylsiloxy terminated polydimethylsiloxane ($A^3$) exhibiting a peak molecular weight species, determined by gel permeation chromatography of about 31,000, a dispersity index of about 3 and a viscosity of about 2.1 Pa.s at 25° C. The organosiloxane copolymer contained repeating units of the formulae $(CH_2=CH)(CH_3)_2SiO_{\frac{1}{2}}$, $(CH_3)_3SiO_{\frac{1}{2}}$ and $SiO_{4/2}$ in a molar ratio of 0.09:0.8:1.0 and was prepared as described in U.S. Pat. No. 2,676,182. The copolymer contained 6.3% by weight of dimethylvinylsiloxy groups.

Ingredient (C) was a dimethylhydrogensiloxy endblocked polydimethylsiloxane containing an average of 13.3 dimethylsiloxane units per molecule.

In addition to the foregoing ingredients, each composition contained 0.42 part of a trimethylsiloxy endblocked dimethylsiloxane/methylhydrogensiloxane copolymer containing an average of 62.5 mole percent methylhydrogensiloxane units and an average of 0.8 weight percent silicon-bonded hydrogen atoms, 0.17 part of cyclic polymethylvinylsiloxanes and 0.12 part of a chloroplatinic acid complex of divinyltetramethyldisiloxane diluted with a liquid dimethylvinylsiloxy endblocked polydimethylsiloxane to achieve a platinum content of 0.7 weight percent.

The amounts of ingredients (A) through (C) present in each of the sixteen compositions prepared, and the molar ratio of silicon-bonded hydrogen atoms to silicon-bonded vinyl radicals in each composition are recorded in the following Table 1. Table 1 also reports the weight ratio of ingredient (B) to all of the polydimethylsiloxanes [ingredients ($A^1$), ($A^2$), and ($A^3$)] present in the curable composition. The compressibility and penetration resistance of the cured gels are reported in Table 2. All of the cured gels were transparent.

TABLE 1

| Sample Number | Ingredient (parts) | | | | | Molar Ratio SiH/SiCH = $CH_2$ | Parts B per 100 parts ($A^1$ + $A^2$ + $A^3$) |
|---|---|---|---|---|---|---|---|
| | $A^1$ | $A^2$ | B | $A^3$ | C | | |
| Invention | | | | | | | |
| 1 | 48.8 | 6.5 | 10.1 | 18.9 | 15.0 | 2.61 | 13.6 |
| 2 | 28.0 | 27.3 | 10.1 | 18.9 | 15.0 | 1.93 | 13.6 |
| 3 | 38.4 | 6.5 | 13.8 | 25.6 | 15.0 | 2.14 | 19.6 |
| 4 | 38.4 | 16.9 | 10.1 | 18.9 | 15.0 | 2.17 | 13.6 |
| 5 | 30.6 | 9.1 | 14.7 | 27.3 | 17.6 | 2.31 | 21.9 |
| 6 | 41.0 | 9.1 | 11.1 | 20.5 | 17.6 | 2.71 | 15.7 |
| 7 | 30.6 | 19.5 | 11.1 | 20.5 | 17.6 | 2.35 | 15.7 |
| 8 | 35.0 | 8.5 | 12.9 | 24.1 | 19.0 | 2.69 | 19.1 |
| Comparative Samples | | | | | | | |
| 9** | 28.0 | 6.5 | 17.4 | 32.4 | 15.0 | 1.85 | 26.0 |
| 10* | 28.0 | 6.5 | 10.1 | 18.9 | 35.8 | 5.99 | 18.9 |
| 11** | 28.0 | 16.9 | 13.8 | 25.6 | 15.0 | 1.89 | 19.6 |
| 12* | 28.0 | 6.5 | 13.8 | 25.6 | 25.4 | 3.54 | 23.0 |
| 13* | 38.4 | 6.5 | 10.1 | 18.9 | 25.4 | 4.18 | 15.8 |
| 14* | 28.0 | 16.9 | 10.1 | 18.9 | 25.4 | 3.62 | 15.8 |
| 15** | 33.2 | 17.7 | 12.2 | 22.2 | 20.2 | 2.86 | 16.7 |
| 16* | 30.6 | 9.1 | 11.1 | 20.5 | 28.0 | 4.27 | 18.4 |

*Samples 10, 12, 13, 14 and 16 did not cure and were not evaluated further.
**Samples 9, 11 and 15 are within the scope of the present invention but did not exhibit the physical properties characteristic of preferred embodiments.

Compressibility Test

Compressibility was measured by placing a cured gel sample measuring 6.4 cm. in diameter and about 1.6 cm. in thickness on the weighing platform of a laboratory balance. A vertically adjustable spherical foot measuring 1.59 cm. in diameter was lowered until it exerted a load of 0.3 g. on the sample, as determined by the weight reading of the balance. The foot was then lowered a distance of 0.23 mm and the weight reading on the balance was recorded as the load required to compress the gel sample. These readings appear in Table 2.

Penetration Resistance Test

The gel samples for this test were prepared by placing 54 g. of a curable composition in a 60 cc capacity cylindrical container and curing the sample as described in the foregoing section of this example. The test was performed using a laboratory model penetrometer manufactured by Precision Scientific Corporation and equipped with a 1.2 cm.-diameter cylindrical foot. The height of the foot was adjusted such that it rested on the surface of the sample without placing any detectable load on the surface of the sample. Weights were then placed on top of the foot in 50 or 100 g. increments until the foot penetrated the surface of the sample. The total amount of weight present when penetration occurred is recorded in Table 2 together with the highest weight at which no penetration was observed.

TABLE 2

| Sample Number | Compressibility (g/0.23 mm compression) | Penetration Resistance (g. prior to and following penetration) |
| --- | --- | --- |
| Invention | | |
| 1 | 14.67 | 300–350 |
| 2 | 32.40 | 750–800 |
| 3 | 49.00 | 1300–1350 |
| 4 | 24.60 | 700–750 |
| 5 | 34.00 | 1150–1200 |
| 6 | 15.50 | 400–450 |
| 7 | 14.50 | 400–450 |
| 8 | 18.16 | 400–450 |
| Comparative Samples* | | |
| 9 | 248.00 | 1550 |
| 11 | 120.00 | 1550 |
| 15 | 4.46 | 100–200 |

*Refer to ** in Table 1

Samples 9 and 11 were above the limits for compressibility and penetration resistance defined hereinbefore for preferred embodiments the present invention. Sample 15 was considerably softer than cured gels prepared using the compositions of this invention. Samples 9, 11 and 15 are all within the broadest scope of this invention.

The data in Tables 1 and 2 demonstrate the wide variation in compressibility and penetration resistance that can be obtained using compositions within the scope of the present invention by varying the molar ratio of silicon-bonded hydrogen atoms to vinyl radicals and/or the relative concentration of resinous copolymer (B). Samples 1, 6, 7 and 8 represent particularly preferred embodiments of this invention, and would be suitable for the fabrication of pressure sensitive optical waveguide devices described hereinbefore.

EXAMPLE 2

This example demonstrates the resiliency exhibited by a preferred cured composition of this invention. The composition identified as number 8 in the preceeding Example 1 was cured in a circular aluminum weighing dish to form a sample measuring 6.4 cm. in diameter and about 1.6 cm. in thickness. The cured sample was covered with a circular piece of 0.4 mm.-thick film of a polyurethane that was approximately equal in diameter to that of the sample.

The covered sample was placed on a substantially horizontal surface directly below a load cell that was attached to the movable beam of Scott model CRE-500 laboratory tester. The load cell was equipped with a vertically oriented 0.16 cm.-diameter spherical foot. The electrical output of the load cell was connected to an X-Y recorder that plotted the loading on the cell as a function of distance traveled by the movable beam.

To ensure that the foot was contacting the test sample, the movable beam of the tester was lowered until the recorder indicated a loading of 5 grams on the cell. This value is referred to herein as $h_1$. The movable beam was then lowered at a rate of 25 cm. per minute to a height of $h_2$, at which the recorder indicated a loading of 25 grams. The beam was then raised to the initial $h_1$ value at a rate of 50 cm. per minute. The rate at which the loading on the load cell returned to the initial 5 g. value indicated that the sample recovered from 95 to 100% of the height lost during compression, equal to $h_1-h_2$, following removal within two seconds of the compressive force exerted by the foot.

The foregoing resiliency test was repeated three times to ensure reproducibility.

That which is claimed is:

1. A pressure sensitive optical waveguide device where at least one beam of light passing through said waveguide is interrupted or deflected by deformation of said waveguide, where said waveguide consists essentially of a gel obtained by curing a curable liquid polyorganosiloxane composition consisting essentially of the produce obtained by mixing (A) 100 parts by weight of at least one liquid triorganosiloxy endblocked polydimethylsiloxane, said triorganosiloxy radicals being selected from dimethylvinylsiloxy and methylphenylvinylsiloxy, where said polydimethylsiloxane exhibits a viscosity of from 1.0 to 500 Pa.s at 25° C.; (B) from 5 to 25 parts of a benzene-soluble copolymer consisting essentially of units of the formulae $CH_2=CH(CH_3)_2SiO_{\frac{1}{2}}$, $(CH_3)_3SiO_{\frac{1}{2}}$ and $SiO_{4/2}$, where the molar ratio of the combination of $CH_2=CH(CH_3)_2SiO_{\frac{1}{2}}$ and $(CH_3)_3SiO_{\frac{1}{2}}$ units to $SiO_{4/2}$ units is from 0.7:1 to 1.2:1, inclusive, and $CH_2=CH(CH_3)_2SiO_2$ units constitute from 2 to 8 percent by weight of said copolymer; (C) an organosiloxane of the formula $H(CH_3)_2SiO[Si(CH_3)_2O]_x$-$Si(CH_3)_2H$, where x is an integer from 0 to 50, in an amount sufficient to provide at least 1.6 silicon-bonded hydrogen atoms per vinyl radical present in said composition; (D) a polyorganosiloxane containing at least three silicon-bonded hydrogen atoms per molecule in an amount sufficient to provide from 5 to 15 percent of the silicon-bonded hydrogen atoms present in (C) and (D), with the proviso that the total number of silicon-bonded hydrogen atoms present in (C) and (D) is from 1.90 to 2.80 times the number of vinyl radicals present in said composition; and (E) an amount of platinum catalyst sufficient to promote curing of said composition;

and where said composition when cured is transparent and exhibits the following physical properties;

a compressibility of 2.2 mm. under a load of from 14 to 50 g. applied by a 1.6 cm. diameter spherical foot; and a resistance to penetration under a load of at least 400 g. applied by a 1.2 cm. diameter cylindrical foot.

2. The optical waveguide device of claim 1 where at least one surface of said waveguide whereon said deformation occurs is overlayed with an adherent, transparent, flexible membrane of a synthetic organic polymer.

* * * * *